Inventors
Joseph J. DeWindt
Edgar E. George
by T. Lloyd LaFrance
Attorney

Patented Apr. 22, 1952

2,593,857

UNITED STATES PATENT OFFICE 2,593,857

DYNAMOELECTRIC MACHINE WITH STATOR CORE SECURED IN YOKE BY WELDED STUDS

Joseph J. De Windt and Edgar C. George, Cincinnati, Ohio, assignors to Allis-Chalmers Manufacturing Company, Milwaukee, Wis., a corporation of Delaware Application June 28, 1949, Serial No. 101,848

3 Claims. (Cl. 171—252)

This invention relates to dynamoelectric machines, and particularly to a method of making the stators thereof and to means for securing stator laminations in the frame of the machine.

It is an object of the invention to provide an improved stator construction for dynamoelectric machines which is economical to manufacture and assemble and which will be of simple and rugged construction.

Another object of the invention is to provide an improved method of making a dynamoelectric machine including a stator core which may have a loose press fit in the stator frame and is secured thereto by a radial connection member.

Other objects and advantages will be apparent from a consideration of the following description taken in connection with the accompanying drawing, in which.

Figure 1:
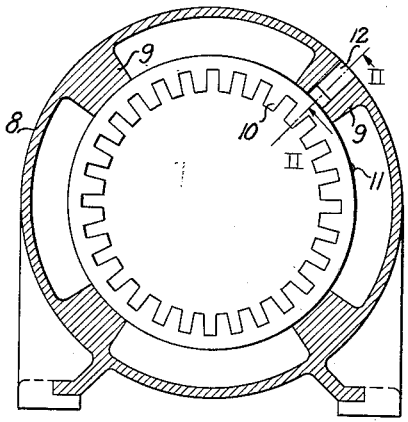
Fig. 1 is a view in transverse cross section taken along line I—I in Fig. 2 through the stator of a dynamoelectric machine embodying the invention.
Figure 2:
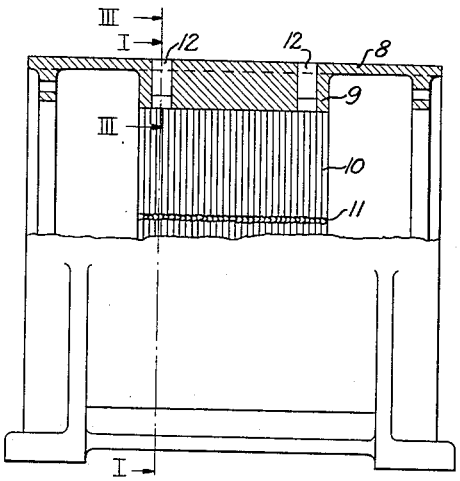
Fig. 2 is a view in side elevation of the machine illustrated in Fig. 1, a portion of the stator frame being assumed removed in front of an inclined plane defined by line II—II in Fig. 1.

Referring to the drawing, numeral 8 indicates a cylinder forming a stator frame or yoke of the dynamoelectric machine. The frame may be made of any suitable material such as cast iron. The frame includes projections 9 forming ribs which extend inwardly and axially thereof and are spaced circumferentially within the frame. The inner cylindrical surfaces of the projections define an open space for receiving the stator of the dynamoelectric machine consisting of a stack of laminations 10. The frame is formed with one or more holes 12 extending through at least one projection and leading to the stator space to accommodate means for securing the stator. The holes may be drilled or may be otherwise formed, as by casting.

The stator laminations 10 are preferably circular and are secured together in any suitable known manner, as by a bead of weld metal 11, to form a laminated cylindrical stator core. The laminated core fits firmly between the supporting projections and is further secured thereto by resistance welding of a body of suitable fusible material such as a steel stud 13 positioned in each of the holes 12 so the steel stud is integrally joined with the periphery of the core laminations 10 by fused metal 15 formed therebetween.

Figure 4:
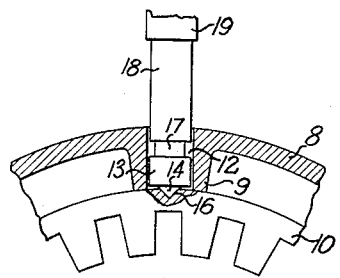
Fig. 4 is a view similar to Fig. 3 showing the electrode used for securing the stator in the frame of the machine.
Figure 3:
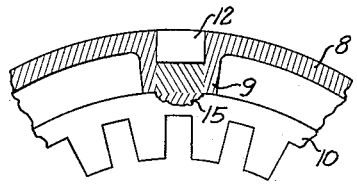
Fig. 3 is an enlarged sectional view taken along the line III—III of Fig. 2.

As shown in Fig. 4, the steel stud 13 is preferably provided with a pointed tip 14. The diameter of the stud 13 is slightly less than the diameter of the hole 12. The other dimensions of the stud are dependent on such factors as strength of welding current, welding time and shear strength of the weld desired.

Stud 13 is welded to core 10 by means of an electrode 17 inserted in the hole 12 and insulated from the walls of the hole by a sleeve or tube 18 of suitable insulating material. Pressure is applied to the electrode through its holder 19 to thereby press the steel stud against the core. To cause the stud to fuse to the laminations, current is supplied from a suitable source (not shown) through electrode 17, stud 13 and core 10.

The method of making the dynamoelectric machine comprises the steps of drilling or otherwise forming holes 12 through the frame 8 and a projection 9, inserting the laminated core into the frame by any suitable known press fitting means, inserting a steel stud in each hole 12, and inserting the electrode 17 in the hole, holding the stud against the periphery of the laminations, and passing a welding current through the electrode, the steel stud, and the core laminations, to cause the end of the steel stud to fuse with the contacting portion of the core laminations.

As shown in Fig. 4, a shallow hole 16 may be drilled in the laminations prior to insertion of stud 13 in hole 12 to enable tip 14 of stud 13 to penetrate the laminations, thereby providing a more extensive bond therebetween upon application of welding current.

Figure 6:
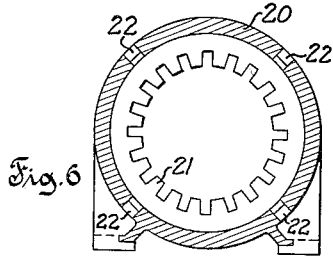
Fig. 6 is a cross sectional view taken along the line VI—VI of Fig. 5.
Figure 5:
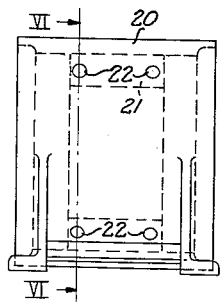
Fig. 5 is a view in elevation of a dynamoelectric machine comprising stator laminations secured in accordance with the present invention in a frame having a continuous bore.
Figure 7:
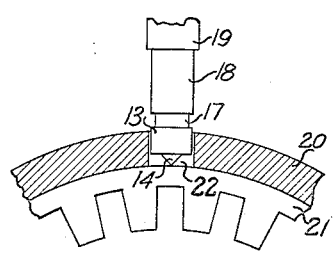
Fig. 7 is a view similar to Fig. 4 of the dynamoelectric machine shown in Fig. 5.

As shown in Figs. 6 and 7, the cylindrical member forming the stator frame 20 may have a continuous bore. Such a frame may be cast or may be fabricated from a piece of sheet steel with the ends welded together to hold it in cylindrical shape so as to define a smooth, uninterrupted internal surface. The relative size of the inside diameter of frame 20 and of the outside diameter of the laminated core 21 inserted therein is such that the core can quickly be inserted with a loose press fit. The frame is drilled to provide one or more holes 22 which may be spaced circumferentially to receive steel studs 13 which are resistance welded for securing the core to the frame to prevent relative axial and circumferential slippage.

From the foregoing description taken in connection with the accompanying drawings, it will be apparent to those skilled in the art that various changes and modifications may be made in the present invention without departing from the spirit thereof or from the scope of the appended claims.

It is therefore claimed and desired to secure by Letters Patent:

1. A dynamoelectric machine including a stator frame defining an open space for stator laminations and at least one aperture leading to said space, stator laminations positioned in said space of said frame, a steel stud positioned in each of said apertures, and fused metal between unfused portions of each of said studs and the periphery of said laminations integrally securing said studs with said laminations for securing said laminations in said frame.

2. A dynamoelectric machine including a frame comprising a continuously cylindrical yoke, said yoke having a plurality of axially spaced holes, stator laminations positioned in said yoke, a stud positioned in each said hole, and fused metal integrally joining each said stud with the periphery of said laminations for securing said laminations in said yoke.

3. A dynamoelectric machine including a frame comprising a generally cylindrical yoke, a plurality of axial projections extending inwardly from said yoke, one of said projections and said yoke defining a pair of holes, stator laminations positioned in said yoke between said projections, a stud positioned in each said hole, and fused metal between each said stud and the periphery of said laminations integrally joining said studs with said laminations for securing said laminations in said yoke.

JOSEPH J. DE WINDT.
EDGAR C. GEORGE.

REFERENCES CITED

The following references are of record in the file of this patent:

UNITED STATES PATENTS

| Number | Name | Date |
|---|---|---|
| 1,194,232 | Raymond | Aug. 8, 1916 |
| 1,995,001 | Ito | Mar. 19, 1935 |
| 2,096,495 | Hogg | Oct. 19, 1937 |
| 2,260,969 | Crecca | Oct. 28, 1941 |
| 2,478,316 | Potter | Aug. 9, 1949 |

FOREIGN PATENTS

| Number | Country | Date |
|---|---|---|
| 228,190 | Great Britain | July 9, 1925 |